United States Patent [19]

Marttinen

[11] 4,452,383

[45] Jun. 5, 1984

[54] CARRYING DEVICE FOR POT PLANT CELL UNITS

[76] Inventor: Toivo O. Marttinen, 56510 Puntala, Finland

[21] Appl. No.: 391,322

[22] Filed: Jun. 23, 1982

[30] Foreign Application Priority Data

Jun. 25, 1981 [FI] Finland .................................. 811988

[51] Int. Cl.³ ............................................. A45C 11/00
[52] U.S. Cl. ........................................ 224/208; 47/73; 224/258
[58] Field of Search ............... 224/202, 208, 206, 257, 224/258, 216, 209, 215; 47/73, 84

[56] References Cited

U.S. PATENT DOCUMENTS

| 44,993 | 11/1864 | Woods | 224/209 X |
|---|---|---|---|
| 749,661 | 1/1904 | Clarke | 224/209 |
| 757,645 | 4/1904 | Bassett | 224/202 |
| 770,761 | 9/1904 | Lemly | 224/216 |
| 794,948 | 7/1905 | Rischard | 224/257 |
| 1,037,717 | 9/1912 | Audley | 224/206 X |
| 1,089,569 | 3/1914 | MacKinnon | 224/202 |
| 1,145,176 | 7/1915 | Willson | 224/206 X |
| 2,987,231 | 6/1961 | Lewis | 224/258 X |
| 2,995,281 | 8/1961 | Dixon | 224/148 |
| 4,159,597 | 7/1979 | Olsen | 47/73 X |

FOREIGN PATENT DOCUMENTS

| 163875 | 8/1949 | Fed. Rep. of Germany | 224/215 |
|---|---|---|---|
| 21061 | of 1890 | United Kingdom | 224/209 |

Primary Examiner—Allan N. Shoap
Assistant Examiner—Robert Petrik
Attorney, Agent, or Firm—Kuhn, Muller and Bazerman

[57] ABSTRACT

Described herein is a carrying device for pot plant cell units, which device comprises a frame (1) supporting the cell units containing the pot plants to be planted, which frame (1) can be, by means of a side arc (9) fastened to same, supported to the waist of the planting person and, on the other hand, by means of harness consisting of belts (14, 16, 19, 20), to the upper body of the planting person. A shoulder belt (14), which passes from the breast side of the planting person across one shoulder to the back side, is at the breast side and at the back side, by means of front and rear connecting rings (17, 17'), connected to a side belt (16) passing around the other side of the planting person. At the breast side of the planting person, the frame (1) is fastened to the front connecting ring (17) by means of a short front belt and, at the back side of the planting person, to the rear connecting ring (17') by means of a longer rear belt (20). By adjusting the belts, the angle of inclination of the frame (1) can be changed.

3 Claims, 2 Drawing Figures

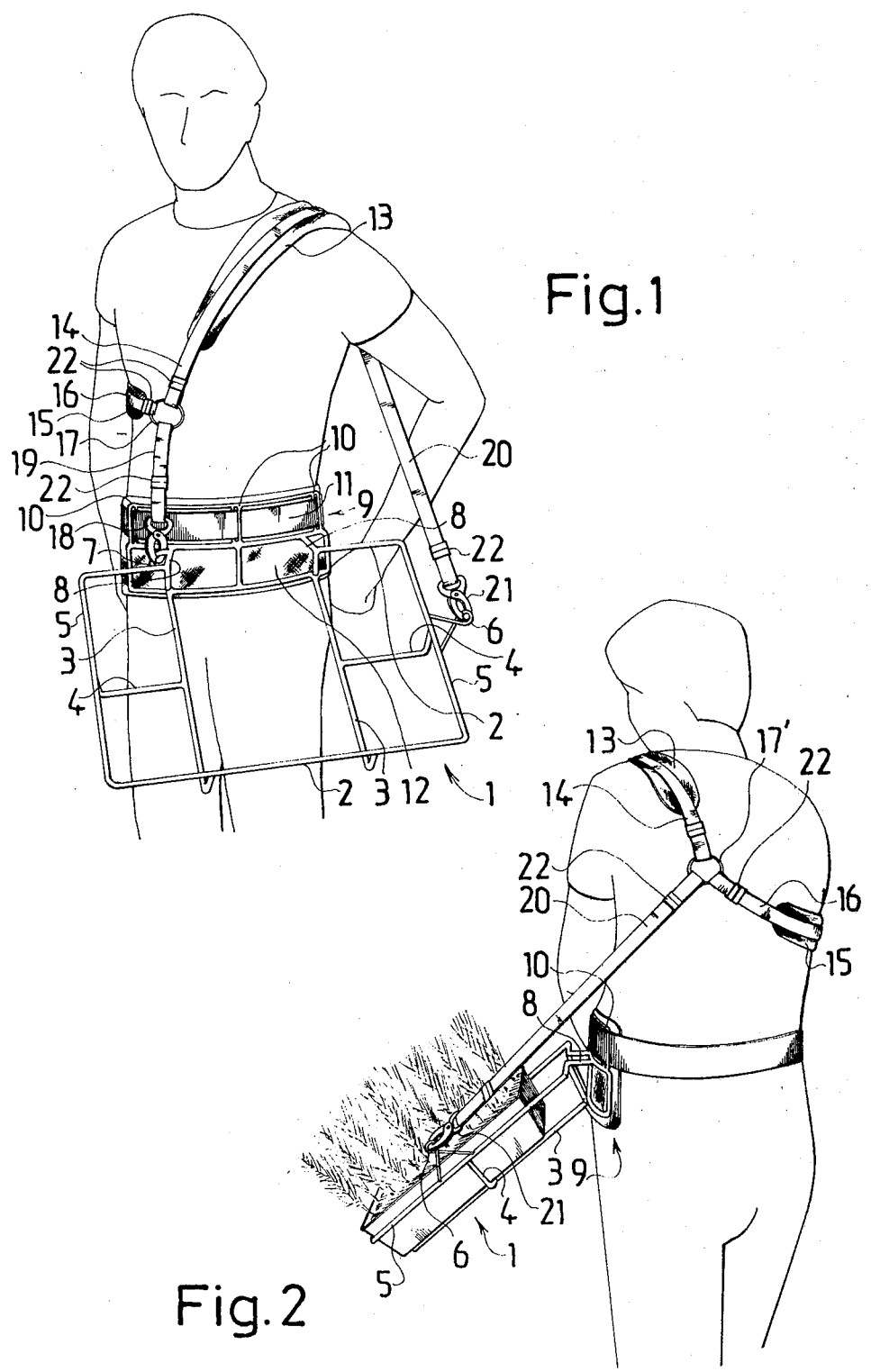

4,452,383

CARRYING DEVICE FOR POT PLANT CELL UNITS

The present invention is concerned with a carrying device for pot plant cell units, which device is supported to the body of the planting person by means of harness so that it remains in such a position that the use of the carrying device does not hamper the planting work itself.

To-day, so-called pot plants are commonly used in forest planting, which pot plants are produced centrally in nurseries, from which the plants at the planting age are transported to the places of planting. In the production of pot plants, cell units have been introduced which are filled mechanically with a growing substratum into which the seed is planted, whereby one plant is developed in each cell as rooted and fixed in its growing substratum pot.

One of such cell units in current use is made of plastic and contains 5×8=40 cells, which are recesses formed out of a plastic sheet by deep drawing. Such a cell unit gives good protection for the sensitive roots of the plants during their development and is sufficiently strong to stand transportation. Moreover, empty cell units can be returned to refilling and be reused.

In order that the plants should start growing well after the transplantation, the aim is always to transport the pot plants right to the planting site without having to remove them from their cells before planting, for thereby the good condition of the plants is guaranteed.

In reaching the above goal, a difficulty is, however, encountered, which results from the planting process itself. To-day, the planting takes place largely by using a so-called planting tube, which is carried by the planting person along with him. The planting by means of the planting tube takes place so that the tube is struck into the ground (usually with both hands) so that a recess is formed, into which the pot plant is then dropped through the upper end of the tube. Thus, the working takes place in the standing position, whereby it has been possible to avoid the strains on the back caused by the earlier mode of planting by means of a hoe. Under these circumstances, in order to avoid bowing down, in the planting work taking place by means of a planting tube it is necessary to use a carrying device for pot plants.

Certain requirements are imposed on the plant carrying device, the most important of them being that the sensitive top portions and the roots of the plants must not be damaged when the plant is inserted into the planting tube. On the other hand, the construction of the carrying device must be such that the weight of the plants does not cause a strain or inconvenience to the planting person. Moreover, the carrying device must be suitable for use by people with different body structures. The pot plant cell unit carrying device in accordance with the present invention, which is characterized in what is stated in the attached patent claims, excellently meets the requirements stated above.

Below, the invention will be described in detail with the aid of drawings, wherein FIG. 1 shows the carrying device as viewed from the front and FIG. 2 as viewed from the back.

As is shown in FIG. 1, the carrying device comprises a rectangular frame 1, on which the pot plant cell unit is placed (see FIG. 2). The frame 1 is formed as a tube frame, whose long sides 2, parallel to the side of the planting person, are interconnected by means of tubes 3 bent to a lower level and placed at a distance from each other, which tubes 3 constitute the main support for the cell unit placed on the frame 1. The tubes 3 are additionally connected by means of side tubes 4 to the shorter sides 5 of the frame 1.

To the rear side 5, as viewed from the planting person, a fastening loop 6 bent out of a tube is fastened, which loop 6 is, in the way shown in FIG. 2, placed as extending outwards from the centre point of the side 5. A second fastening loop 7 (FIG. 1) is placed at the connecting point between the side 2 next to the side of the planting person and the tube 3 placed forwards as viewed from the planting person.

The frame 1 is, substantially by means of tubes 8, fastened to a side arc 9 following the side of the planting person, the arc being perferably at an angle of 45° to the frame 1. Thus, the frame 1 is inclined downwards from the planting person, which guarantees that the top portions of the plants are not subjected to rubbing when the plants are shifted into the planting tube.

In spite of the inclined position, the cell unit is kept reliably on the frame 1. The side arc 9 is provided with lengthy vertical slots 10, through which the waist belt 11 of the carrying device is passed. The length of the waist belt is adjustable, and it is provided with a snap lock in order to facilitate the opening and closing. Underneath the side arc 9, a cushion 12 is placed. The function of the waist belt 11 is to keep the frame 1 in contact with the person's side and to prevent rotation of the frame.

In order to support the frame 1 against the body, harness is used which comprises a cushioned (13) shoulder belt 14, which passes from the breast of the planting person across the shoulder to the back side, as well as a cushioned 15 side belt 16, which passes from the breast side of the planting person across the right side to the back side. The side belt 16 and the shoulder belt 14 are connected to each other at their ends by means of connecting rings 17, 17' placed both at the breast side and at the back side.

The harness also includes a rather short front support belt 19, hich is attached to the connecting ring 17 at the breast side of the planting person and which can be attached to the loop 7 of the frame 1 by means of a bridle lock 18, as well as a rear support belt 20, which is connected to the connecting ring 17' at the back side of the planting person and which is, by means of a bridle lock 21, attached to the fastening loop 6 of the frame 1. All the support belts 14,16,19,20 are provided with buckles 22, by means of which the lengths of the belts can be adjusted so as to be suitable for each body type.

By means of the above locations of the harness belts, the load caused by the weight of the plants on the frame 1 is distributed evenly between the left shoulder, right side, and the left hip. As the shoulder belt 14 is placed on the left shoulder, the strains caused by a support belt, usually placed on the right shoulder, on the neck muscles and on the larger blood vessels are avoided. Thereby the working performance of the right hand, which usually carries and operates the planting tube, is improved.

The function of the front support belt 19 is to keep the frame 1 at a certain level, and the function of the rear support belt 20 is, on the other hand, to adjust the angle of inclination of the frame 1 in relation to the body. The above possibilities of adjustment make the carrying device in accordance with the invention suitable for many body types.

The invention is not restricted to the embodiment of the above description and drawings, but it may be varied within the scope of the patent claims.

For instance, the arrangement of the belts may be reversed so as to make the device suitable for lefthanded persons.

The angle of inclination of the frame may, of course, vary depending on the type of plants and the body of the planting person. The range 40° to 50° could be considered typical.

What I claim is:

1. A carrying device for pot plant cell units, containing pot plants to be planted, the carrying device being of the type which is designed to be supported to the body of a planting person, comprising:
   a rectangular tube frame having two long sides and two short sides, for supporting the cell units;
   a side arc fastened to one of the long sides of the frame for supporting the frame to the waist of the planting person;
   a shoulder belt for passing from the breast side of the planting person across one shoulder to the back side;
   a side belt passing around the side of the person, opposite said one shoulder;
   a front belt connected to the frame near the side arc;
   a rear belt connected to one short side of the frame;
   a front connecting element for interconnecting the shoulder belt, the side belt, and the front belt at the breast side of the planting person;
   a rear connecting element for interconnecting the shoulder belt, the side belt, and the rear belt at the back side of the planting person; and wherein the frame is inclined from the side arc downwards at an angle of inclination of 40 to 50 degrees, preferably about 45 degrees.

2. A device as claimed in claim 1 further comprising on the short side of the frame adjacent the back side of the planting person a fastening loop for the rear belt arranged to extend outwards from the centre point of the side.

3. A device as claimed in claim 1, wherein the connection of the front belt to the frame comprises a fastening loop.

* * * * *